United States Patent
Rolff et al.

[11] 3,757,576
[45] Sept. 11, 1973

[54] APPARATUS FOR MEASURING THE QUANTITY OF OUTFLOW IN OPEN CANALS OR THE LIKE

[75] Inventors: Jacob J. P. Rolff, Schwaikheim; Franco P. Di Marco, Stuttgart, both of Germany

[73] Assignee: J. C. Eckardt AG, Cannstatt, Germany

[22] Filed: Dec. 17, 1970

[21] Appl. No.: 99,104

[30] Foreign Application Priority Data
Dec. 18, 1969 Germany............... P 19 63 413.0

[52] U.S. Cl............................ 73/194 EM, 73/227
[51] Int. Cl............................ G01f 1/00, G01p 5/08
[58] Field of Search............... 73/194 EM, 227, 304, 73/290 R, 198; 324/34 FL, 40

[56] References Cited
UNITED STATES PATENTS
3,490,282  1/1970  Wada............................ 73/194 EM
3,550,446  12/1970  Tucker et al. ................. 73/194 EM

FOREIGN PATENTS OR APPLICATIONS
43/13013  12/9965  Japan............................ 324/34 FL
1,291,523  12/1964  Germany...................... 73/194 EM Primary Examiner—Charles A. Ruehl
Attorney—Craig, Antonelli, Stewart & Hill

[57] ABSTRACT

An apparatus and a process for measuring the quantity of flowing liquids being discharged in open canals, gutters, partially filled pipes or the like, wherein a measured value is obtained for the flow velocity and the height of the level by measuring the voltage induced in an electromagnetic field by movement of the liquid. Two coils are provided, at least one of which can be switched on or off separately from the other one. The coils are arranged in a cross manner such that the field resultants thereof extend in the flow direction and at right angles thereto, and at least one of the coils is connected so that its polarity can be reversed. The electromagnetic fields are alternately switched vertically for measuring the velocity and horizontally for measuring the level, and then multiplying the measured values with each other.

15 Claims, 2 Drawing Figures

APPARATUS FOR MEASURING THE QUANTITY OF OUTFLOW IN OPEN CANALS OR THE LIKE

BACKGROUND OF THE INVENTION

The present invention relates to a process and apparatus for measuring the quantity of flowing liquids being discharged in open canals, gutters, channels or partially filled pipes, wherein a measuring entity is obtained for the flow velocity on the basis of measuring the voltage induced in an electromagnetic field by movement of the liquid and, additionally, the height of the level is likewise determined.

Measuring devices and processes for the determination of the outflow quantity of the aforementioned type have been proposed heretofore. In the conventional processes, an electromagnetic field is produced and oriented at right angles with respect to the flow direction. The measuring areas or surface is oriented with respect thereto with the aid of strip of band-shaped electrodes or the like, in such a manner that this area intersects at least a portion of the magnetic lines of force. By means of a phase separator arrangement, it is then possible, on one hand, to determine the component voltag produced by the velocity of the flowing liquid and, on the other hand, to determine the component voltage induced by the height of the level, which component voltage is phase-shifted by 90° with respect to the component voltage produced by the velocity of the liquid. From the two found values, a value is then obtained for the quantity of outflow.

These measuring devices are relatively expensive, especially because of the required phase separator unit. Besides, measuring errors can occur due to the variable contact or transfer resistances between the dry portion and the wet portion of the obliquely disposed strip electrodes. Another difficulty in the conventional measuring devices resides, furthermore, in the fact that the measuring area may deviate from the vertical with respect to the flow direction only by a few degrees, if both component voltages are to be on the same order of magnitude and are to be processed by amplifiers of the same power or efficiency. Moreover, the energy requirement for the conventional measuring devices is also relatively high.

SUMMARY OF THE INVENTION

It is the aim of the present invention to overcome the problems and disadvantages encountered in the prior art devices and processes.

The present invention further aims at providing a measuring process and apparatus, wherein it is possible to omit the phase separator arrangement and the exact adjustment of the measuring elements.

The foregoing problems and disadvantages have been solved in accordance with the present invention by starting with the realization that it is necessary to deviate from the arrangement of the oblique measuring surface or area and thus the disposal of sensitive electrode designs, and that the reversal of the known measuring arrangement, i.e., the oblique positioning of the magnetic field does not yet, by itself, make a sensible solution possible. The process of the present invention resides in alternately switching the magnetic field vertically for measuring the velocity and horizontally for measuring the level, and in multiplying the successively obtained values with each other.

In this manner, it is possible, on one hand, to obtain a discontinuous measurement which also permits maintaining the energy requirement for the determination of the outflow quantity at a low value. On the other hand, a phase separator arrangement becomes superfluous, since the individual component voltages can be determined separately. In this connection, it is advantageously possible to electronically store the result of one measurement until it is multiplied with the second value. Consequently, it is also readily possible to obtain an automatic evaluation and, optionally, a longrange or remote transmission of the found values.

In order to conduct the process of the present invention, it is particularly advantageous to provide two coils, of which at least one can be switched on and off separately from the other one. However, the measuring apparatus becomes particularly simple if the two coils are arranged in a crossed manner so that their field resultants extend in the flow direction and at right angles thereto, and at least one of the coils is connected so that its polarity can be reversed. In this manner, it is possible to rotate the magnetic field by 90° simply by reversing the polarity of one of the coils, so that the two desired values for the height of the level and for the velocity can be derived.

It is also possible to make the excitation current of both coils reversible with respect to polarity and, advantageously, to provide an electronic storage means for receiving the measuring values obtained by the electrodes as well as a device for determining the outflow quantity value from the stored measuring values. The measuring device in accordance with the present invention makes it possible in a particularly advantageous manner to provide only two electrodes for the reception of the measuring value, which electrodes are suitably disposed at the bottom or in the zone of the bottom of the measuring path and thus are, in general, constantly surrounded by the liquid. This eliminates capacitive disturbances by the fact that electrode portions project from the measuring liquid.

BRIEF DESCRIPTION OF THE DRAWING

These and further aims, features and advantages of the present invention will become more apparent from the following description when taken in conjuncation with the accompanying drawing which shows, for purposes of illustration only, a schematic representation of the coil arrangement of the present invention at a part of a measuring path or section and wherein.

DETAILED DESCRIPTION OF THE DRAWING

Figure 1:
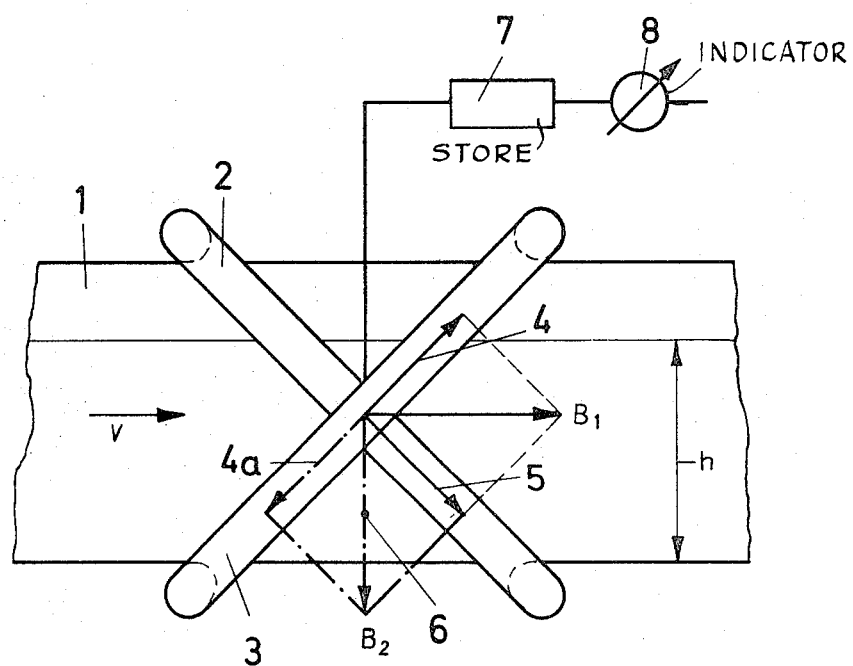
FIG. 1 is a schematic side view of a partially filled channel or gutter with the measuring device of the present invention.

Referring now to the drawing and, in particular, to FIG. 1, a channel 1 opened at the top is shown filled up to the level $h$ with an electrically conductive liquid. The channel 1 has, for example, a certain amount of waste water flowing therethrough at the velocity $v$. Crossed coils 2 and 3 are arranged around the channel with the electromagnetic field of these coils extending, upon excitation of the coils, in the direction of the arrows 4 and 5. Accordingly, when the two coils 2 and 3 which are to be formed of the same size and the same efficiency or power are excited, a horizontal electromagnetic field $B_1$ is produced in the measuring plane. This field makes it possible, by way of the electrodes 6 (of which only one is illustrated) disposed in the zone of the bottom of the channel 1, to measure the height of the level $h$ in the channel 1. This is done, for example, by generating, for about 2 minutes, the field $B_1$ and conducting the level measurement during this time. A representative value of the level measurement can be amplified in the manner illustrated in greater detail in FIG. 2 and stored in an electronic storage unit 7. The average or median value or the last-measured value, for example, can serve as the representative value.

Thereafter, the polarity of the voltage applied to coil 2 is reversed, so that its field now extends in the direction of the arrow 4a shown in dot-dash lines. Thereby, the field resultant of the coils 2 and 3 points vertically downwardly in accordance with the arrow $B_2$. The magnetic field is now oriented at right angles to the flow direction v, and it is likewise maintained for about two minutes, so that a value for the flow velocity can be determined by the electrodes 6, which value is constantly multiplied with the representative value for the level height h contained in the storage means 7 and which can be read off from an indicator 8 or can be further transmitted to a central measuring station. Thus, the multiplication yields the amount of outflow per time unit over a certain period of time. It would, of course, also be possible to store a representative value of the velocity measurement and than multiply the same with the values of the level measurement.

Figure 2:
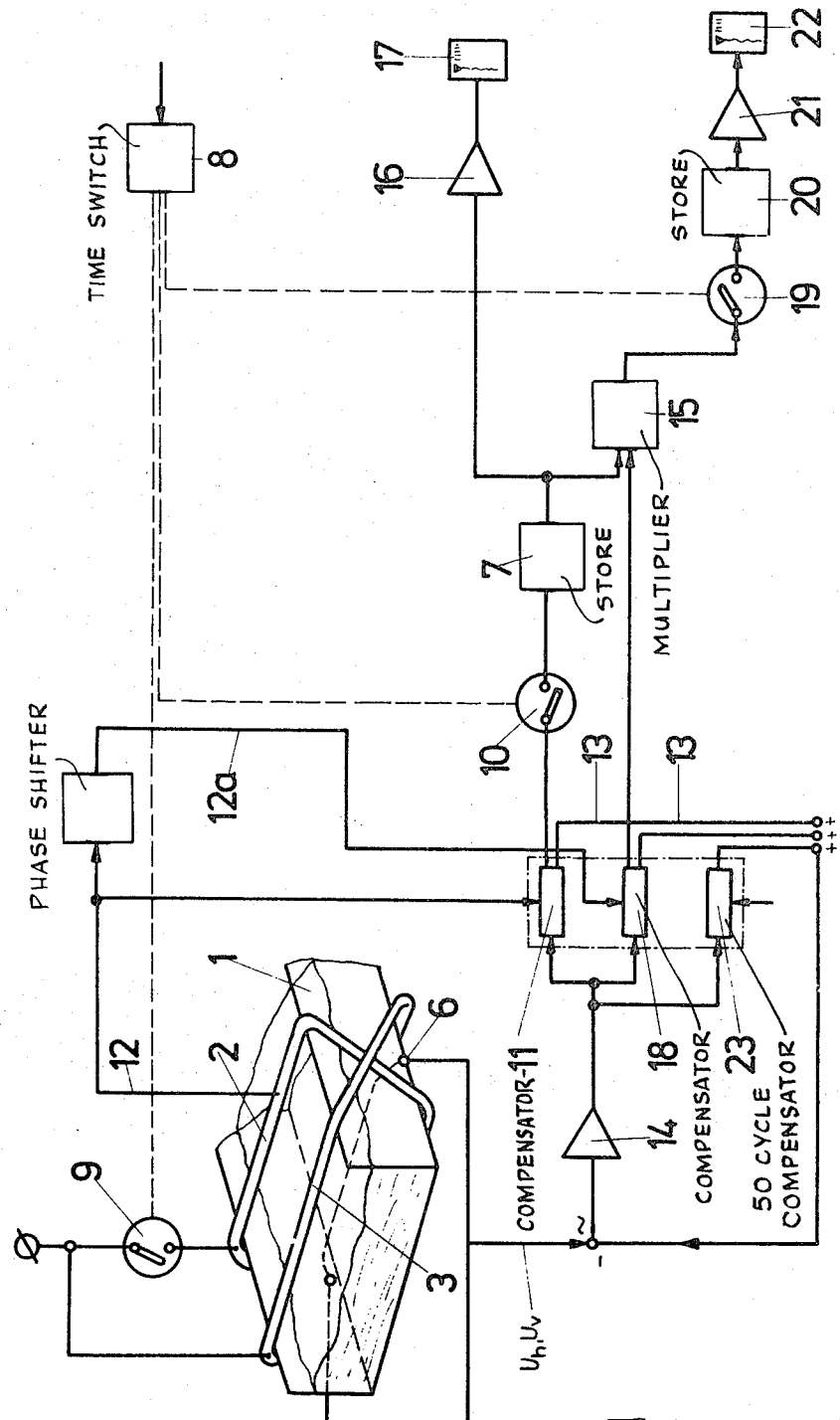
FIG. 2 is a block circuit diagram of the electrical arrangement for evaluating the measuring values determined according to the present invention.

FIG. 2 shows the circuit diagram for performing the storage and multiplication processes. A time switch 8' connects the magnet coil or field coil 2 with the magnet coil 3 by means of the switch 9, in such a manner that the horizontal $B_1$ is produced. At the same time, the switch 10 is closed during a period of about 1 or 2 minutes. The level in the channel is now being measured. The measuring voltage $U_h$, which is produced at the electrodes 6, is amplified and fed to the compensating portion 11 which is controlled by a reference voltage derived from line 12. Part of the measuring voltage is separated at 13 and employed for feedback purposes. Another portion of the measuring voltage is converted into direct current in the compensating unit 11 via the amplifier 14 and applied to the storage unit 7 in the form of a representative value by means of switch 10. Subsequently, this level signal is fed, on one hand, to the multiplier 15 and, on the other hand, to the D.C. amplifier 16 and to the level indicator or recorder 17.

Thereafter, the velocity is measured for about 1 minute, the magnetic field being switched to extend vertically by means of the switch 9. The voltage $U_v$, which is now produced at the electrodes 6, is presently applied by means of the amplifier 14 to the compensating section 18 which is controlled by the reference voltage 12a, which is phase-shifted by 90°. A portion of the voltage $U_v$ is again separated at 13 and employed for feedback purposes. Another portion of the measuring voltage is converted in the compensating section 18 into direct current and fed to the multiplier 15. The switch 10 is opened by the time switch 4' and the switch 19 is closed. The product $U_h \cdot U_v$ formed in the multiplier 15 is now applied by means of the storage unit 20 and the amplifier 21 to the outflow recorder 22.

If the magnetic outflow meter is employed for the measurement of the quantity of outflow of rivers or the like, it is impossible in many cases to provide a sufficient electrical insulation of the river bed. This produces, on one hand, a loss of measuring voltage, since part of the measuring current flows or drains off through the groundwater. On the other hand, there is the danger of the formation of an interference voltage at the electrodes 6. In the proximity of high-voltage and high-tension current plants, A.C. currents in the ground or earth flow preferably toward the river, since the conductivity of the water is higher than that of the soil. Such ground currents cause a voltage at the electrodes.

In general, these ground currents exhibit a frequency of 50 cycles. Thus, care must be taken that alternating voltages of 50 cycles have no influence on the measurement, which can be effected by operating the measuring device, for example, with 60 cycles. In the amplifier, a 50-cycle compensating unit 23 is then additionally provided for avoiding the interference caused by the alternating voltage of 50 cycles. The aforementioned measurement of the outflow can be repeated at certain intervals, for example every five minutes, an excitation of the coils 2 and 3 being omitted between the individual measurements. The energy requirement for the measuring device in accordance with the present invention can be kept very low in this manner.

While we have shown and described an embodiment in accordance with the present invention, it is to be clearly understood that the same is susceptible of numerous changes and modifications as will be apparent to one skilled in the art. We, therefore, do not wish to be limited to the details shown and described herein, but intend to cover all such changes and modifications as are encompassed by the scope of the present invention.

We claim:

1. Apparatus for measuring the quantity of outflow of flowing electrically conductive liquid in open canals, channels, gutters, partially filled pipes or the like, comprising electromagnetic field generating means for generating an electromagnetic field in said liquid so that measured values of flow velocity and liquid level can be obtained by measuring a voltage induced in the liquid by the electromagnetic field and the movement of the conductive liquid, measuring means for measuring said voltage induced in said liquid, and means for switching said electromagnetic field generating means so as to alternately generate vertical and then horizontal fields in said liquid.

2. Apparatus according to claim 1, wherein said electromagnetic field generating means includes two coils selectively connected to a source of energizing voltage.

3. Apparatus according to claim 2, wherein time switch means connects one coil with the other coil to said source of energizing voltage by a first switch means to produce, for a period of time, a first field resultant extending in the flow direction, a second switch means operatively connected with the time switch means and the coils and being closed during the measurement of the height of the liquid level, said measuring means including two electrodes receiving the measured voltage, first compensating means controlled by a first reference voltage and being fed with the measured voltage for converting the same into a direct current and supplying the same to a first storage unit via the second switch means for subsequent feeding to a multiplier means and a level indicator by means of a D.C. amplifier.

4. Apparatus according to claim 3, wherein said first switch means includes means for switching the resultant field normal to the flow direction, second compensating means controlled by a second reference voltage phase-shifted by 90° and being fed with the measured voltage for converting the same into a direct current and supplying the same to the multiplier means with the second switch means being opened by the time switch means, and third switch means being operatively associated with the time switch means, the multiplier means, and a second storage unit, whereby when the second switch means is open, the third switch means is closed so that the product formed in the multiplier means is fed by means of the second storage unit and an amplifier an outflow recorder.

5. Apparatus according to claim 4, wherein the two coils are arranged in a crossed manner such that the field resultants thereof extend in the flow direction and at right angles thereto.

6. Apparatus according to claim 5, wherein at least one of the coils is connected to means for reversing the polarity of the energizing voltage applied thereto.

7. Apparatus according to claim 6, wherein both coils are connected to means for reversing the excitation current supplied thereto with respect to its polarity.

8. Apparatus according to claim 1, wherein said measuring means includes electrode means for receiving the measured values and connected to supply the same to electronic storage means, and means is provided for determining the value of the outflow quantity from the stored measured values.

9. Apparatus according to claim 8, wherein said electromagnetic field generating means includes two coils selectively connected to a source of energizing voltage.

10. Apparatus according to claim 9, wherein the two coils are arranged in a crossed manner such that the field resultants thereof extend in the flow direction and at right angles thereto.

11. Apparatus according to claim 10, wherein at least one of the coils is connected to means for reversing the polarity of the energizing voltage applied thereto.

12. Apparatus according to claim 11, wherein both coils are connected to means for reversing the excitation current supplied thereto with respect to its polarity.

13. Apparatus according to claim 8, wherein the electrode means consists of only two electrodes for receiving the measured values.

14. Apparatus according to claim 8, wherein the electrode means is located at least in the zone of the bottom of the measuring path.

15. Apparatus according to claim 14, wherein the electrode means consists of only two electrodes for receiving the measured values.

* * * * *